United States Patent [19]
Schuh

[11] Patent Number: 5,623,970
[45] Date of Patent: Apr. 29, 1997

[54] FIELD INSTALLABLE CHOKE TUBE

[75] Inventor: David N. Schuh, Calgary, Canada

[73] Assignee: Beta Machinery Analysis Ltd., Calgary, Canada

[21] Appl. No.: 547,528

[22] Filed: Oct. 24, 1995

Related U.S. Application Data

[63] Continuation-in-part of Ser. No. 835,342, Feb. 14, 1992, Pat. No. 5,460,205.

[51] Int. Cl.⁶ ........................................ F16L 55/04
[52] U.S. Cl. ................... 138/40; 138/44; 138/26; 138/108
[58] Field of Search .................. 138/40, 26, 37, 138/41–46, 108, 109, 111, 113, 114; 248/49, 58, 74.1, 74.2

[56] References Cited

U.S. PATENT DOCUMENTS

| | | | |
|---|---|---|---|
| 4,129,324 | 12/1978 | Jones, Jr. ........................ | 285/107 |
| 4,231,230 | 11/1980 | Gratzer et al. .................. | 138/26 X |
| 4,570,745 | 2/1986 | Sparks et al. ................... | 138/26 X |
| 4,576,204 | 3/1986 | Smallhorn et al. .............. | 138/44 X |
| 4,679,597 | 7/1987 | Stein ................................ | 138/26 |
| 4,690,245 | 9/1987 | Gregorich et al. .............. | 138/40 X |
| 4,838,299 | 6/1989 | Behrens .......................... | 137/203 |
| 5,172,729 | 12/1992 | Vantellini ........................ | 138/26 |

*Primary Examiner*—David Scherbel
*Assistant Examiner*—Patrick F. Brinson
*Attorney, Agent, or Firm*—John Russell Uren

[57] ABSTRACT

A field installable choke tube apparatus and a method for installing the choke tube into a pulsation dampener of a compressor. The choke tube is insertable into the pulsation dampener through the nozzle of the pulsation dampener. The supporting apparatus for the choke tube is located between the choke tube and the nozzle. The supporting apparatus is movable relative to the nozzle of the pulsation dampener thereby to firmly hold the choke tube within the dampener.

12 Claims, 10 Drawing Sheets

FIELD INSTALLABLE CHOKE TUBE

CROSS-REFERENCE TO RELATED APPLICATION

This is a continuation-in-part application of U.S. patent application Ser. No. 07/835,342 entitled FIELD INSTALLABLE CHOKE TUBE and filed Feb. 14, 1992, now U.S. Pat. No. 5,460,205.

INTRODUCTION

This invention relates to a choke tube installation for a compressor and, more particularly, to a choke tube which will facilitate its installation into a pulsation dampener for a compressor on site in the field.

BACKGROUND OF THE INVENTION

Pulsation dampeners are ordinarily used in field operations to allow compressors to run quieter and with less vibration. Such pulsation dampeners ordinarily consist of a bottle with a choke tube installed therein. The installation of such choke tubes, however, is normally achieved by removing the bottles from the compressor located in the field and installing the desired choke tube in a shop or other workplace where the bottles may be disassembled so as to allow the installation of the choke tube.

Such installation, however, can result in major compressor down time while the choke tube is being installed in the bottle and, further, the costs of removing and transporting the bottle to the remote location together with the necessary disassembly and reassembly at such location can be significant. Likewise, the installation is inconvenient.

SUMMARY OF THE INVENTION

According to one aspect of the invention, there is provided a method of installing a choke tube within a pulsation dampener adapted for use on a compressor, said method comprising the steps of inserting a choke tube having a predetermined configuration through the nozzle of said pulsation dampener and supporting said choke tube within said pulsation dampener by choke tube supporting apparatus, said choke tube supporting apparatus being movable relative to said choke tube and said pulsation dampener.

According to a further aspect of the invention, there is provided choke tube apparatus for a pulsation dampener comprising a choke tube operable inserted into said pulsation dampener, said pulsation dampener having a nozzle, a first wedge member operably connected to one of said choke tube or pulsation dampener, a second wedge member being stationary relative to the other of said pulsation dampener or choke tube and a connector extending between said first and second wedge members, said connector being adjustable to increase or decrease the distance between said first and second wedge members.

BRIEF DESCRIPTION OF THE SEVERAL VIEWS OF THE DRAWINGS

An embodiment of the invention will now be described, by way of example only, with the use of drawings in which.

DESCRIPTION OF SPECIFIC EMBODIMENT

Figure 1:
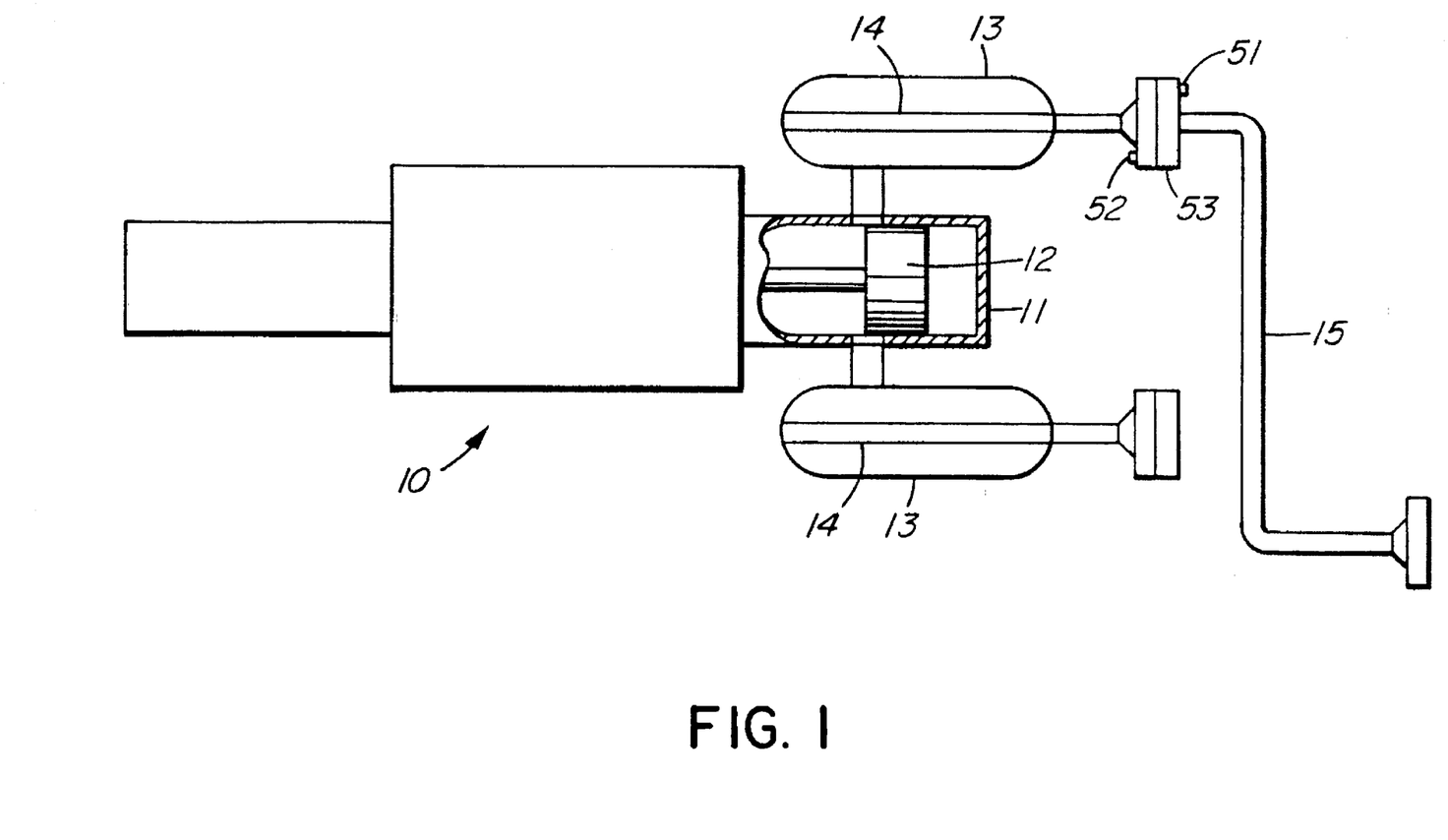
FIG. 1 is a diagrammatic side view of a compressor with respective pulsation dampeners attached, each pulsation dampener having a choke tube illustrated diagrammatically therein.

Referring now to the drawings, a compressor is illustrated generally at 10 in FIG. 1. It comprises a cylinder 11 with a piston 12 reciprocally movable therein.

Two pulsation dampeners or "bottles" 13 are typically mounted on opposite sides of the cylinder 11. To provide adjustment to the effectiveness of the pulsation dampeners 13, a choke tube generally illustrated at 14 is mounted within each pulsation dampener 13. Each such choke tube 14 has a predetermined diameter and is mounted at a predetermined location within the pulsation dampener 13, the diameter and the location depending upon the desired acoustical adjustment intended with such installation, the former factor usually being the most important.

In existing practise, the pulsation dampeners 13 may or may not have choke tubes 14 mounted therein. In any event, if it is intended to mount a choke tube 14 therein or to change the position of the choke tube 14 within the pulsation dampener 13, it is necessary to remove the pulsation dampener 13 from the suction pipe 15 and subsequently move it to a remote location, disassemble the dampener 13 and install or adjust the choke tube 14 to the predetermined most desirable location. Typically, the choke tube 14 is positioned by welding it to a flange (not shown) which is then attached to the bottle 13 in its desired location also by welding.

Figure 2A:
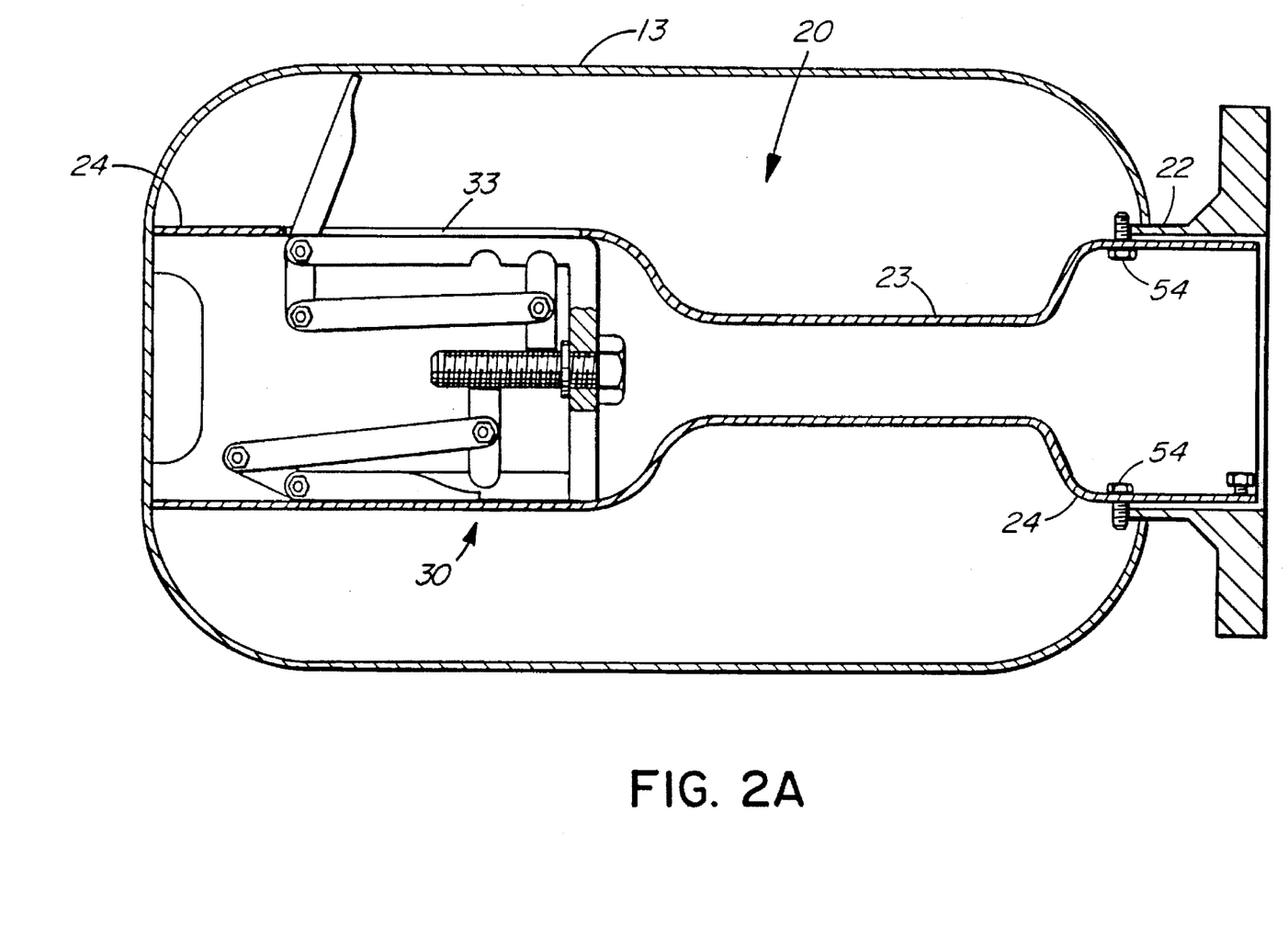
FIG. 2 is a diagrammatic side view of a typical choke tube according to the invention with the support apparatus illustrated in a partially supporting configuration.
Figure 2B:
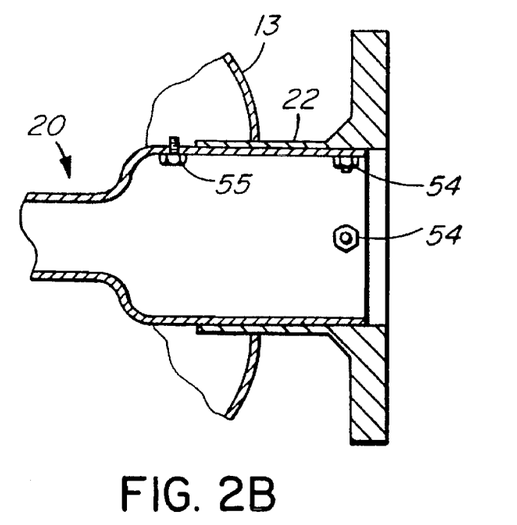

Referring now to FIG. 2, a typical choke tube according to the invention is illustrated generally at 20. It comprises an enlarged first end 21 positioned adjacent the nozzle 22, a central portion 23 of reduced diameter located between the first end 21 and a distant end portion 24 which is used to house the support apparatus generally illustrated at 30. The outside diameters of the first end 21 and the distant end portion 24 are smaller than the inside diameter of the nozzle 22 such that the choke tube 20 can be inserted into the pulsation dampener 13 through the nozzle 22 without removing the nozzle from the pulsation dampener 13 or removing the pulsation dampener 13 from the compressor 10 although under some conditions the pulsation dampener 13 may be conveniently removed to more easily install the choke tube 20.

The distant end portion 24 has three slots 34 located at 120 degree intervals. Each slot 24 is used to allow the extension and retraction of the support arms 40 as will be described in greater detail hereafter. Each slot 24 conveniently has a width of 1 inch and a length which is dependent on the inside diameter of the bottle 13 in which the support apparatus 30 is installed.

Figure 3A:
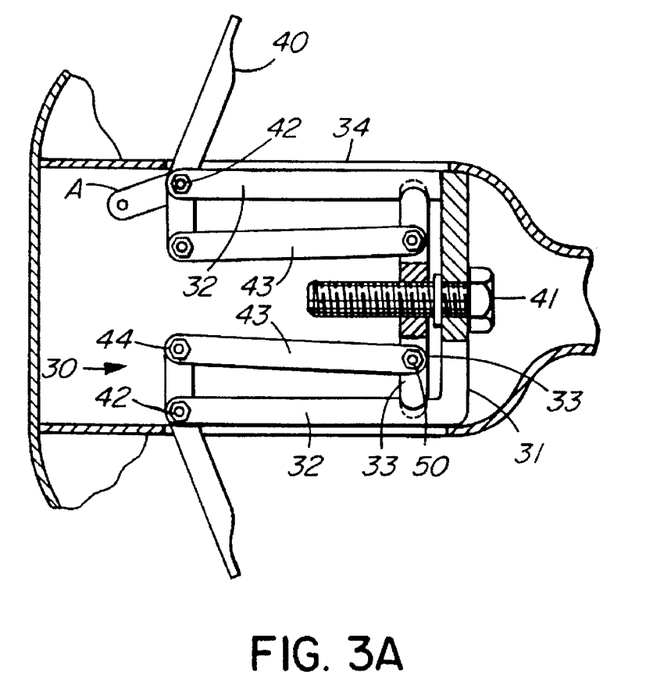
FIG. 3A is an enlarged diagrammatic side view of the support apparatus within the choke tube, the support apparatus being in its support configuration between the choke tube and the pulsation dampener or bottle.
Figure 3B:
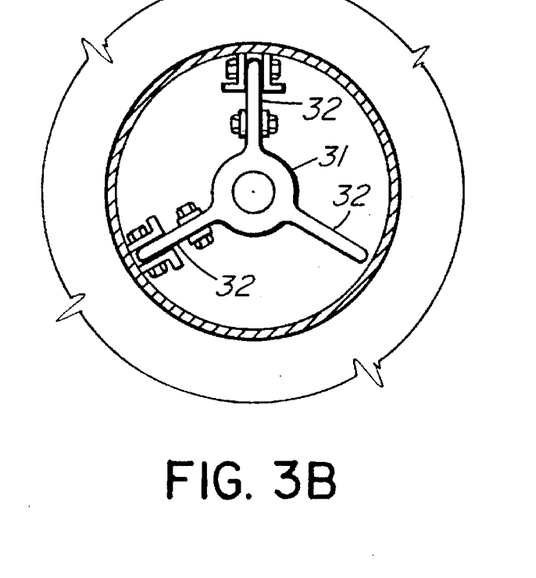
FIGS. 3B and 3C are end diagrammatic views of the support apparatus of FIG. 3A illustrating the attachment of the connecting links to the yoke and the movable collar, respectively.
Figure 3C:
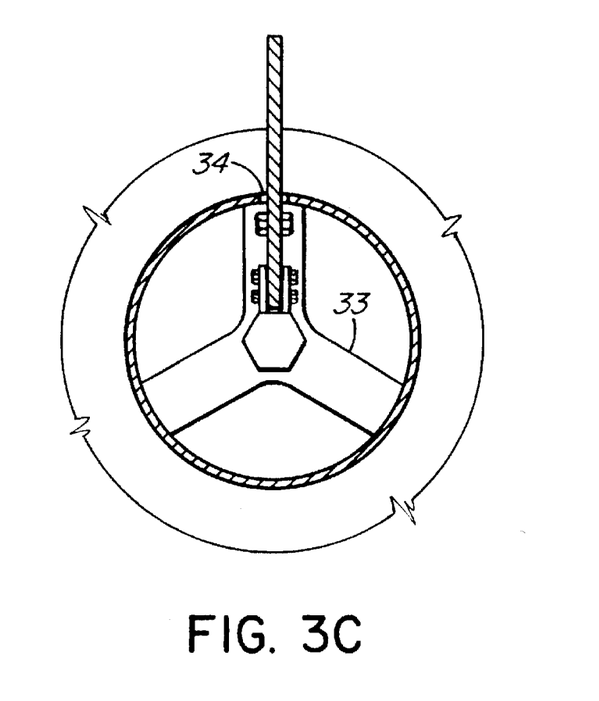

The support apparatus 30 is shown in an enlarged form in FIGS. 3A, 3B and 3C. It comprises a yoke 31 which is conveniently welded in a fixed position within the distant or enlarged end portion 24 of the choke tube 20. The yoke 31 has three outwardly and rearwardly extending arms 32 mounted thereto. The arms 32 are located 120 degrees apart as clearly seen in FIG. 3B.

A movable collar 33 is mounted for reciprocal movement on the yoke 30. It is threadedly engaged with a bolt 41 which is rotatable relative to the yoke 31 and which extends through the yoke 31 to the collar 33.

Three support arms 40, one for each longitudinally extending arm of yoke 41, are mounted on the arms 32 about bolts 42. Bolts 42 allow pivotable movement of the support arms 40.

Three links 43, one for each of the support arms 40, are mounted for pivotable movement between the end of each support arm 40 and the movable collar 33. Respective bolts 44, 50 are provided for the ends of links 43 and allow such pivotable movement.

OPERATION

In operation, it will be assumed that the pulsation dampeners 13 have no choke tubes 14 therein and that a recommendation has been made to install such choke tubes 14 so as to reduce the pulsation and vibration associated with the compressor 10.

With reference to FIG. 1, the bolts 51 which join the nozzle flange 52 and the suction pipe flange 53 are removed and the suction pipe 15 together with its flange 53 is removed. An opening then extends through the nozzle flange 53 and the nozzle 22 directly into the pulsation dampener 13.

The support apparatus 30 will have been previously installed in the choke tube 20 as, for example, by welding and the choke tube 20 with the support apparatus 30 installed therein will be inserted into the interior of the pulsation dampener 13 through the opening in nozzle 22. In such position, the bolt 41 will be rotated previously such that the movable collar 33 is in a position a maximum distance from collar 31; that is, in a position where the links 43 have caused support arms 32 to assume the position illustrated at "A" in FIG. 3A within the interior of the choke tube 20 and lying immediately under the slots 34.

Upon assuming complete entry to the pulsation dampener 13, the first end 21 is locked to the nozzle 22 using set screws 54 conveniently mounted at an 120° interval around the inside diameter or choke tube 20 and which extend between the inside of choke tube 20 and the nozzle 22. If desired and particularly in the case of discharge bottles, the choke tube 20 may be further secured to the bottle nozzle 22 by installation of a further bolt 55 (FIG. 2B) located so that the bolt 55 encounters the inside end of the bottle nozzle 22.

This will prevent longitudinal movement of the choke tube 20 through the nozzle 22 in the event the set screws 54 are inadvertently loosened. It is also intended to provide some degree of longitudinal movement for the choke tube 20 within the pulsation dampener 13 so that the distant end 24 of the choke tube can firmly contact the opposite end of the pulsation dampener 13, if desired. Such longitudinal movement can be provided by the connection utilising the bolts 54.

A suitable tool is then inserted through the nozzle 22 and the choke tube 20 so as to rotate the bolt 41. As bolt 41 is rotated, the collar 33 moves towards yoke 31 together with links 43. Links 43, in turn, cause the support arms 40 to move outwardly from the longitudinal axis of the choke tube 20 and through the slots 34 until the support arms 40 contact the inside of the pulsation dampener 13 thereby to retain the choke tube 20 within the pulsation dampener 13. Bolt 41 is appropriately tightened to provide the proper retention force between the support arms 40 and the pulsation dampener 13 to provide a secure connection for the choke tube 20 within the pulsation dampener 13.

The operation for the oppositely located bottle 13 proceeds similarly and following installation of the choke tubes 20 in each bottle or pulsation dampener 13, the suction pipe 15 and the suction pipe flange 53 are again connected to the nozzle flange 52 and the unit is returned to operation without the necessity of removing the pulsation dampeners 13 from their field locations.

There are many modifications which may be made in the apparatus without departing from the spirit of the invention. For example, the support apparatus which is particularly described may be modified in many different respects as long as the choke tube 20 can be inserted through the opening in nozzle 22 and, thereafter, be appropriately and securely retained in its operating position within the pulsation dampener.

Figures 4A, 4B:
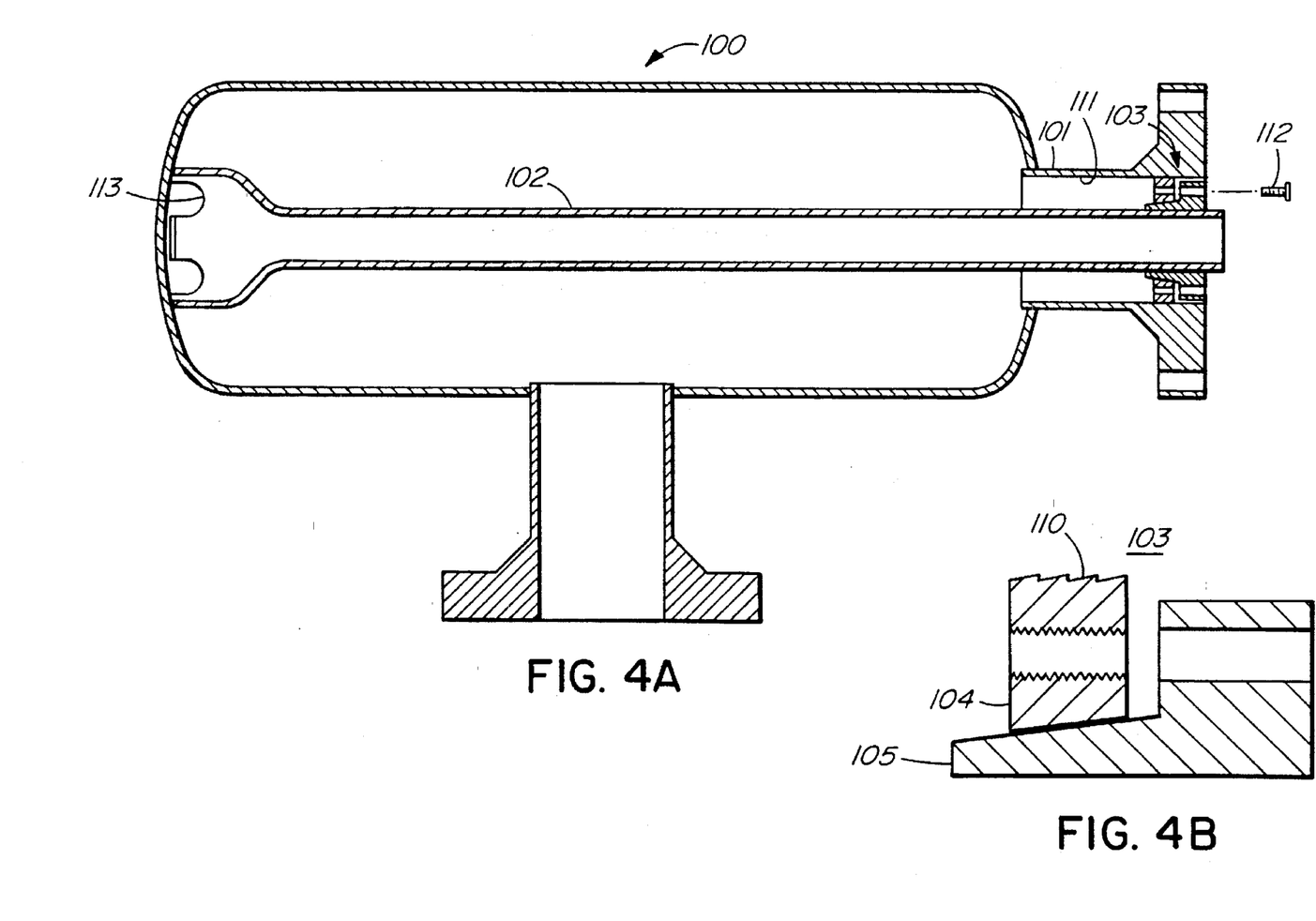
FIG. 4A is a cutaway view illustrating a further embodiment of the invention with the choke tube supported by way of wedge members mounted in the nozzle of the pulsation dampener.
FIG. 4B is an enlarged view of the wedge members.
Figure 5:
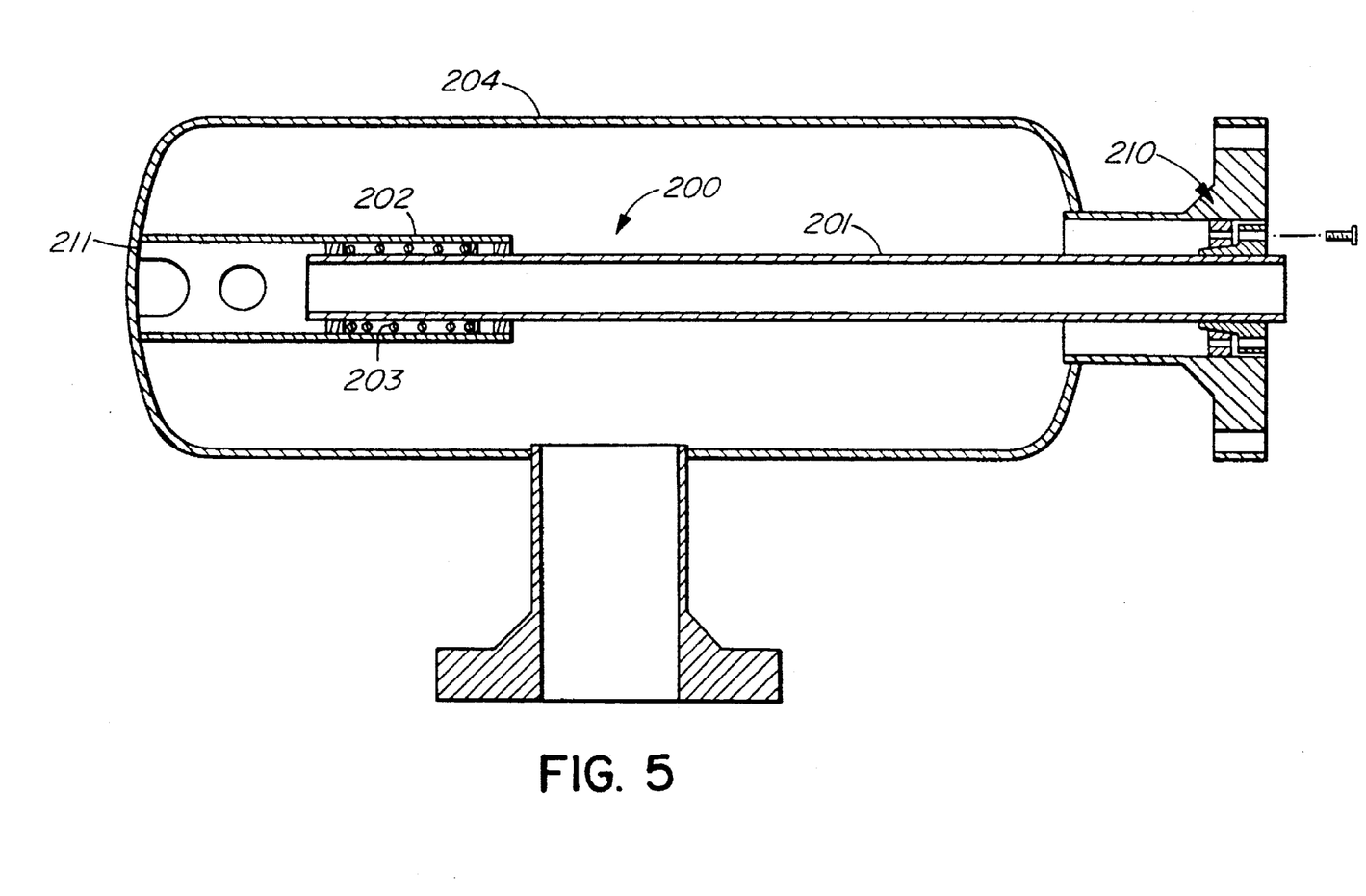
FIG. 5 is a cutaway view similar to that of FIG. 4A but illustrating a two section choke tube biased into contact with the interior of the pulsation chamber.

A further embodiment of the invention is illustrated in FIGS. 4A, 4B and 5. FIG. 4A relates to a pulsation dampener 100 with a nozzle 101 in which the choke tube 102 is partially supported by a support apparatus generally illustrated at 103 and shown in more detail in FIG. 4B.

The support apparatus 103 includes a fixed wedge piece 105 which is welded to the choke tube 102 as indicated. A moving jaw 104 extends between the wedge piece 105 and the inside diameter of the nozzle 101. A series of ridges 110 are formed on the outside of the moving jaw 104 and these ridges contact the inside of the inside diameter 111 of the nozzle 101. A plurality of pull rods 112 have a threaded end which threads into a complementary threaded hole 113 of moving jaw 104.

The choke tube 102 extends from the nozzle 101 into the interior of the pulsation dampener 100 and the pull rods 112 are tightened in order to exert a force between the moving jaw 104 and the wedge piece 105. Since the ridges or teeth 110 remain in contact with the interior of the nozzle 101, the wedge piece 105 and the attached choke tube 102 will be drawn leftwardly as viewed in FIG. 4A and the end 113 of the choke tube 102 will contact the end of the pulsation dampener 100 and be maintained in position within the interior of the pulsation dampener 100. Reference is now made to FIG. 5 which is similar to FIGS. 4A and 4B but where the choke tube generally illustrated at 200 has two sections 201, 202 which telescope. A compression spring 203 is mounted between the two sections and tends to bias the second section 202 away from the end of first section 201; that is, it tends to bias the second section 202 leftwardly as viewed in FIG. 5 and into contact with the interior of the pulsation dampener 204. The support apparatus 210 is precisely the same as the support apparatus 103 in FIGS. 4A and 4B and acts in the same manner; that is, it tends to move the choke tube 200 leftwardly as viewed in FIG. 5 thereby bringing the end 211 of choke tube 201 into contact with the interior of the pulsation chamber 204, the compression spring 203 maintaining the end 211 of choke tube 201 in forceful contact with the pulsation chamber 204.

Figure 6:
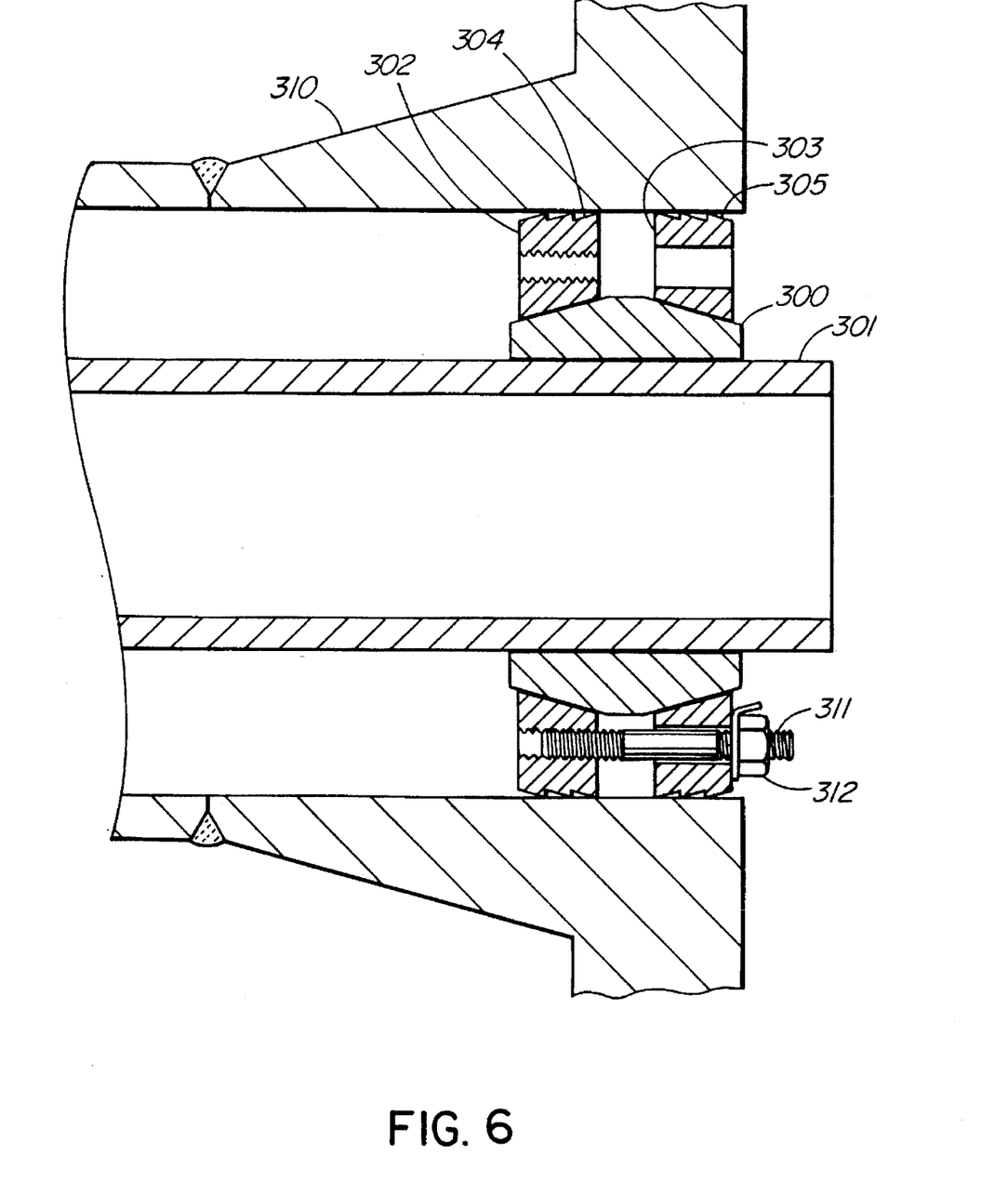
FIG. 6 is a cutaway view of a further wedge mounting mechanism used to maintain the choke tube within the nozzle of the pulsation dampener.

A further embodiment of the invention is illustrated in FIG. 6. In this embodiment, the wedge piece 300 is again welded to the choke tube 301 but two moving jaws 302, 303 are positioned on the ramps of the wedge piece 300. Each moving jaw 302, 303 has a series of ridges or teeth 304, 305 which contact the interior of the nozzle 310. In operation, as the pull rods 311 exert a force tending to pull the two moving jaws 302, 303 together when nut 312 is rotated, a radial force is exerted on the wedge piece 300 thereby resulting in a strong retaining force on the choke tube 301 which extends into the interior of the pulsation dampener (not illustrated).

Figure 7A:
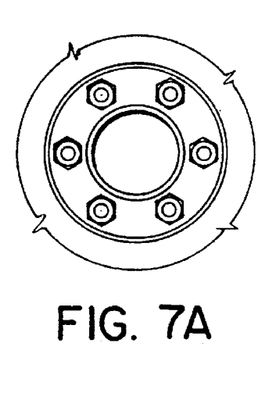
FIG. 7A is an end view of a pulsation dampener according to a further aspect of the invention illustrating the placement of the clamp studs and pull tubes.
Figure 7B:
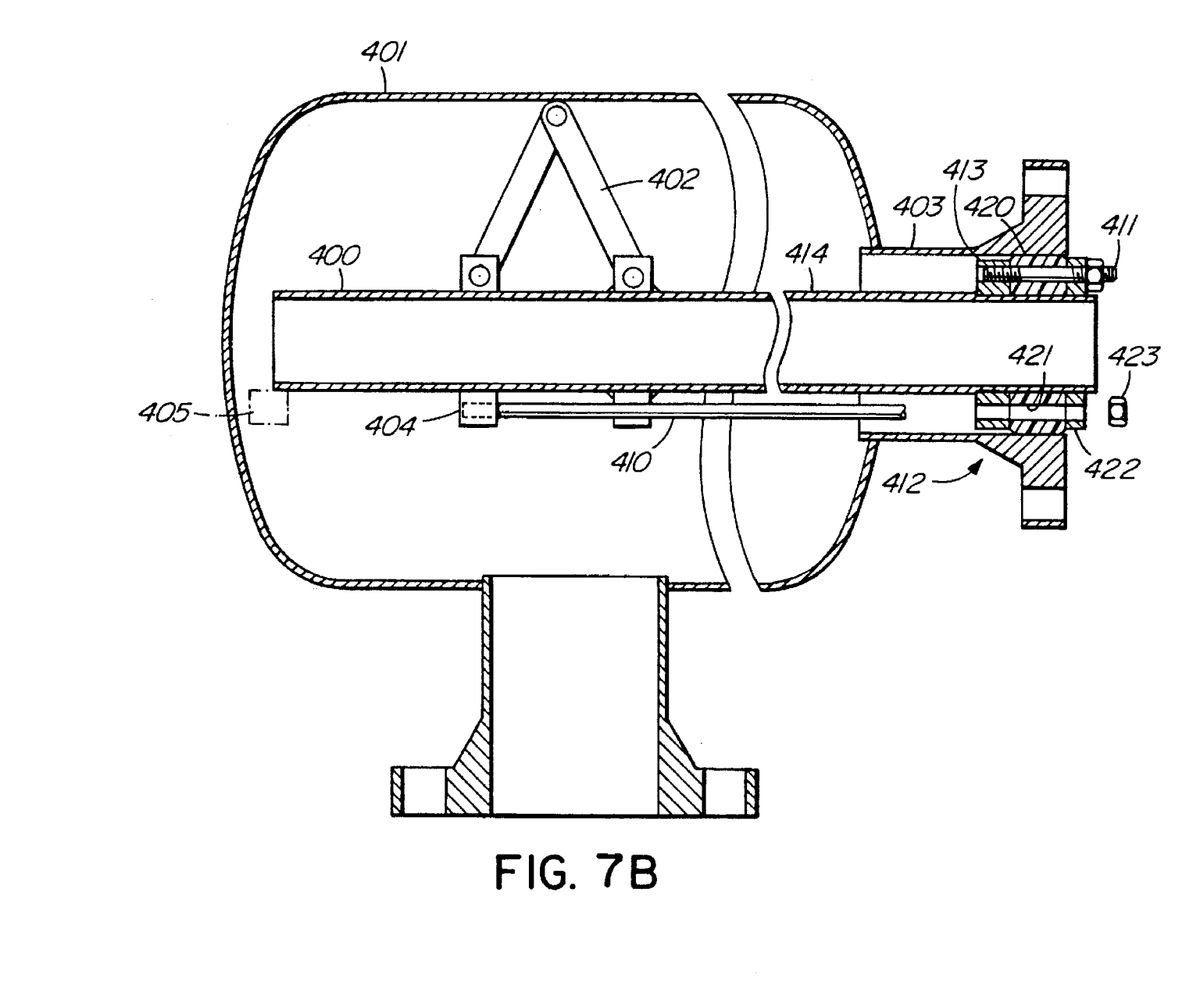
FIG. 7B is a side cross-sectional view of the pulsation dampener according to FIG. 7A.

Yet a further embodiment of the invention is illustrated in FIGS. 7A and 7B. In this embodiment, the choke tube 400 extends into the interior of the pulsation dampener 401 with the three articulated struts 402 being horizontal and the end 404 of which takes the position 405 when the choke tube 400 is inserted through the nozzle 403. As seen in FIG. 7A, there are three pull rods 410, only one of which is illustrated and three clamp struts 411, only one of which is illustrated.

The support structure generally illustrated at 412 comprises a threaded collar 413 welded to the choke tube 414, a urethane block 420 with an anti-crush sleeve 421 which will prevent the collapse of the urethane block 420 on the pull rods 410 and a clamp block 422 which contacts the urethane block 420 and applies pressure to the urethane block 420 when the pull rods 410 are tightened with nuts 423.

In operation, the pull rods 410 are tightened and the three articulated struts 402 extend to contact the interior of the pulsation chamber 401 as is illustrated. Similarly, the clamp studs 411 are threaded into the collars 413 and tightened so that the urethane block 420 exerts a radial force on the interior of the nozzle 403 to assist in maintaining the choke tube 414 in its desired position within the pulsation dampener 401.

Figure 8:
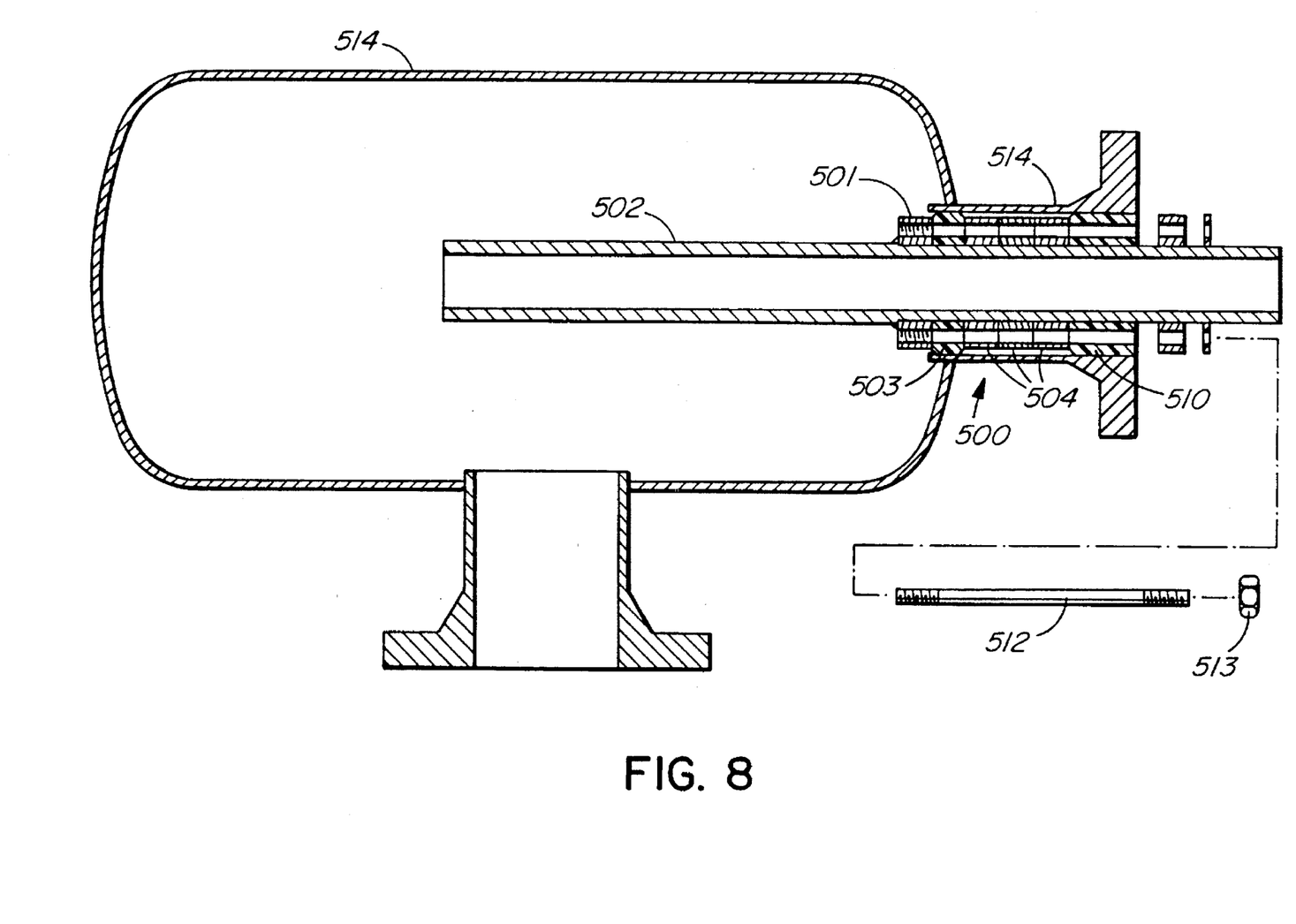
FIG. 8 is a view of choke tube maintained in position within the pulsation dampener according to a further aspect of the invention.
Figure 9A:
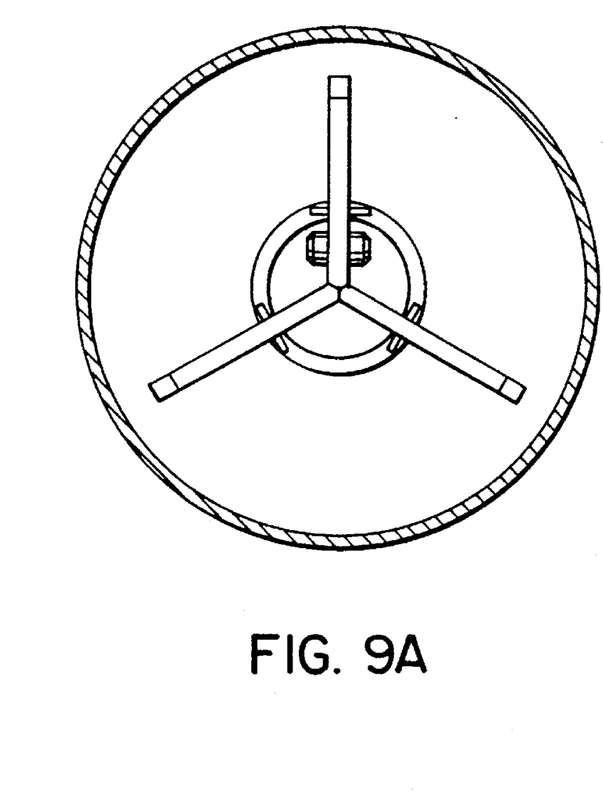
FIGS. 9A and 9B are partial views of the pulsation dampener and choke tube supporting apparatus according to a further aspect of the invention.
Figure 9B:
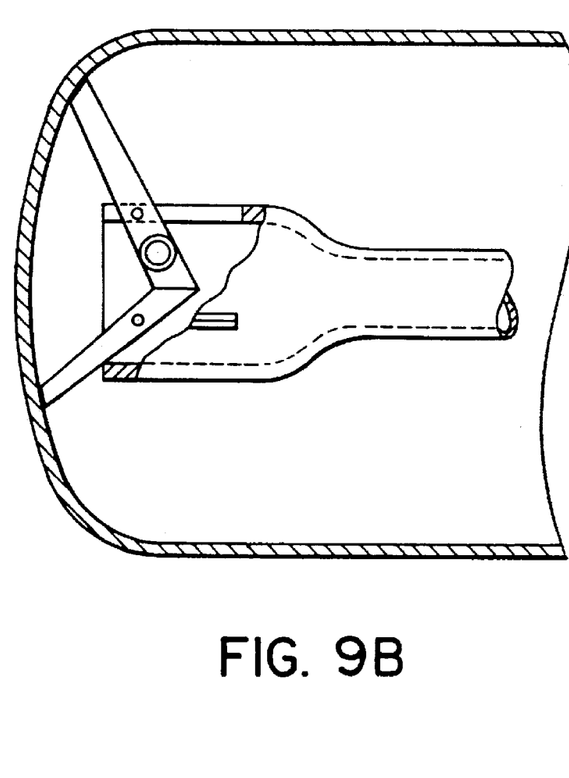

Yet a further embodiment of the invention is illustrated in FIG. 8. In this embodiment, the choke tube support apparatus generally illustrated at 500 comprises a collar 501 with a threaded hole therein, the collar 501 being welded to the choke tube 502. A urethane block 503 contacts the collar 501 and three steel spacers 504 are positioned around the choke tube 502 and in contact with the urethane block 503. A second urethane block 510 is positioned around the choke tube 502 and a clamp block 511 is brought into contact with the urethane block 510 through which the four clamp studs 512 are positioned and tightened with nuts 513 again to exert a strong radial restraining force on the nozzle 514 to thereby firmly hold the choke tube 502 within the pulsation dampener or suction or discharge vessel 514.

The specific embodiments described are illustrative of the invention only and should not be taken as limiting its scope. Many further modifications will readily occur to those skilled in the art to which the invention relates without departing from the scope of the invention as defined in accordance with the accompanying claims.

What is claimed is:

1. A method of installing a choke tube within a pulsation dampener adapted for use on a compressor, said method comprising the steps of inserting a choke tube having a predetermined configuration through the nozzle of said pulsation dampener, supporting said choke tube within said pulsation dampener by choke tube supporting apparatus, said choke tube supporting apparatus being located between said choke tube and said nozzle, said supporting apparatus being movable relative to said nozzle of said pulsation dampener.

2. A method as in claim 1 wherein said choke tube apparatus comprises a first wedge member connected to said choke tube, a second wedge member in operable engagement with said first wedge member, said second wedge member being stationary relative to said pulsation dampener, and a connector extending between first and second wedge members, said first wedge member being movable relative to said second wedge member when the distance between said first and second wedge members is changed.

3. A method as in claim 2 wherein said first wedge member is connected to said choke tube, said second wedge member is stationary relative to said nozzle and said connector moves said first wedge member and said choke tube relative to said second wedge member and said nozzle.

4. A method as in claim 1 wherein said movement of said choke tube is toward the interior of said pulsation dampener.

5. Choke tube apparatus for a pulsation dampener comprising a choke tube operably inserted into said pulsation dampener, said pulsation dampener having a nozzle, a first wedge member operably connected to said choke tube, a second wedge member being stationary relative to said pulsation dampener and a connector extending between said first and second wedge members, said connector being adjustable to increase or decrease the distance between said first and second wedge members.

6. Apparatus as in claim 5 wherein said first wedge member is operably connected to said choke tube and said second wedge member is stationary relative to said pulsation dampener, said connector being operable to move said first wedge member and said choke tube into the interior of said pulsation dampener.

7. Apparatus as in claim 6 wherein said choke tube has first and second sections, said second section being mounted on said first section and being movable relative thereto, said second section being biased to move away from said first section.

8. Apparatus as in claim 7 wherein said second section is biased by a spring mounted between said first and second sections.

9. Apparatus as in claim 8 wherein said second section has an end remote from said nozzle and operable to be brought into contact with said pulsation dampener, said second section being adjustable relative to said first section.

10. Choke tube apparatus for a pulsation dampener comprising a choke tube operable to be inserted into said pulsation dampener, said pulsation dampener having a nozzle, a first wedge member operably connected to said choke tube, a second wedge member with first and second segments being separated axially and engaging with said first wedge member, a connector extending between said first and second segments and being operable to decrease the axial distance between said first and second segments, said first and second segments exerting a radial force on said first wedge member thereby being operable to maintain said choke tube in an operable position within said nozzle of said pulsation dampener.

11. Apparatus as in claim 10 and further comprising support apparatus within said pulsation dampener, said support apparatus extending outwardly from said choke tube and being expandable so as to contact the interior of said pulsation dampener after said choke tube has been inserted into said pulsation dampener.

12. Apparatus as in claim 11 wherein said support apparatus includes arms, said arms being expandable and gravity operated.

* * * * *